(12) United States Patent
Kim

(10) Patent No.: US 6,222,746 B1
(45) Date of Patent: Apr. 24, 2001

(54) POWER SUPPLY DEVICE AND METHOD WITH A POWER FACTOR CORRECTION CIRCUIT

(75) Inventor: Hong-Ki Kim, Youngin (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/247,280

(22) Filed: Feb. 9, 1999

(30) Foreign Application Priority Data

Feb. 9, 1998 (KR) ................................................ 98-1431

(51) Int. Cl.[7] ............................. H02M 5/42; G05F 1/10
(52) U.S. Cl. ........................... 363/89; 363/80; 323/222
(58) Field of Search ................................. 363/89, 37, 80, 363/81; 323/222, 210, 282, 285, 207

(56) References Cited

U.S. PATENT DOCUMENTS

| 5,515,261 | 5/1996 | Bogdan . |
| 5,568,041 | * 10/1996 | Hesterman ......................... 323/207 |
| 5,612,609 | 3/1997 | Choi . |
| 5,644,214 | 7/1997 | Lee . |
| 5,726,871 | 3/1998 | Choi . |
| 5,757,166 | 5/1998 | Sodhi . |
| 5,757,635 | 5/1998 | Seong . |
| 5,764,039 | 6/1998 | Choi . |
| 5,905,491 | * 5/1999 | Kim ..................................... 363/41 |
| 5,910,891 | * 6/1999 | Jo ....................................... 363/89 |

* cited by examiner

Primary Examiner—Peter S. Wong
Assistant Examiner—Rajnikant B. Patel
(74) Attorney, Agent, or Firm—Robert E. Bushnell, Esq.

(57) ABSTRACT

A power supply device for supplying power to an electronic apparatus with a power saving mode includes a rectifier circuit for converting an AC input voltage Vin to a DC voltage, a boost circuit for boosting the DC voltage to a prescribed level, a power factor correction (PFC) circuit for correcting the power factor of the output voltage of the boost circuit according to a feedback voltage from the output of the boost circuit, and a disable circuit for disabling the power factor correction (PFC) circuit in a power saving mode, whereby the power consumption is prevented for a switching operation of the power factor correction (PFC) circuit in the power saving mode.

12 Claims, 4 Drawing Sheets

POWER SUPPLY DEVICE AND METHOD WITH A POWER FACTOR CORRECTION CIRCUIT

CROSS REFERENCE TO RELATED APPLICATION

This application makes reference to, incorporates the same herein, and claims all benefits accruing under 35 U.S.C. §119 from application for POWER SUPPLY DEVICE WITH A POWER FACTOR CORRECTION CIRCUIT earlier filed in the Korean Industrial Property Office on Feb. 9, 1998, and there duly assigned Serial No. 98/1431.

BACKGROUND OF THE INVENTION

1. Field of The Invention

The present invention concerns a power supply device and method with a power factor correction circuit.

2. Description of the Related Art

A switching mode power supply device exemplary of contemporary practice in the art generally includes a rectifier circuit for rectifying an alternating current voltage (AC) voltage into a ripple voltage, a power factor correction (PFC) circuit connected between the rectifier circuit and a load with a power saving mode to correct the power factor of the output voltage, and a pulse width modulation (PWM) circuit. The power saving mode of the load is achieved by apower saving mode control circuit such as display power management system (DPMS) connected to the load.

A power factor correction circuit exemplary of contemporary practice in the art includes a power factor correction (PFC) controller, a switching transistor, and a booster transformer for boosting the output voltage of the rectifier circuit, which consists of bridge diodes, according to the turning on/off of the switching transistor. In this case, the rectifier circuit is to convert an alternating current voltage (AC voltage) into a direct current voltage (DC voltage) of a ripple waveform. The supplied AC voltage, for example, is about 90V to 260V. Additionally provided are a diode for rectifying the voltage induced in the primary coil of the boost transformer, a smoothing capacitor and a voltage divider for regulating the output voltage of the power factor correction (PFC) circuit.

In the normal mode of the power supply device, the rectifier circuit supplies a direct voltage to the power factor correction (PFC) circuit, where the output DC voltage comes to have a value of about 400V according to the on/off operation of the switching transistor. The output is applied to the PWM control circuit, thereby securing the normal operation of the main power supply circuit. When the load such as an electronic apparatus is set to the power saving mode by a microprocessor or display power management system (DPMS), the duty ratio of the output pulses of the pulse width modulation (PWM) control circuit becomes much lower than in the normal mode, so that the load is supplied with the minimum power required only to operate the control circuit for controlling the power saving mode. However, the circuit exemplary of contemporary practice in the art requires the continuous operation of the power factor correction (PFC) circuit even in the power saving mode, thus causing power consumption due to the turning on/off of the switching transistor.

U.S. Pat. No. 5,515,261 to Bogdan entitled Power Factor Correction Circuitry, discloses a power factor correction circuit for use with a power supply. It is disclosed that the power supply has an input for receiving an AC input signal, a rectifier for producing a rectified AC signal and an output stage for outputting a DC output signal for driving a load coupled to the output stage. The power factor correction circuit comprises an input port coupled to the rectifier for receiving the rectified AC signal; and an inductor coupled to the input port for storing energy in response to excitation by the rectified AC signal. The excitation of the inductor is controlled through the opening the closing of a switch by a controller. A capacitor is coupled to the inductor and charged by the energy stored in the inductor when the switch is opened to produce the DC output signal. The power factor correction circuit includes a diode for blocking the charge path between the input port and the capacitor and also allowing the controller to boost the charge level on the capacitor.

U.S. Pat. No. 5,568,041 to Hesterman entitled Low-cost Power Factor Correction Circuit and Method for Electronic Ballasts, discloses apower factor corrected electronic ballast circuit. An embodiment includes a discontinuous conduction mode boost power factor correction circuit that is controlled with a simple pulse-width modulator (PWM) circuit comprising a few discrete components instead of an integrated circuit. The PWM circuit unitizes a reference waveform signal derived from the ballast inverter. The reference waveform is combined with a feedback signal to create a composite signal that is compared with a reference voltage to create a pulse-width-modulated signal. The feedback signal is used to regulate the bulk DC voltage. In an alternative embodiment, a feed forward signal that is proportional to the time-varying level of the rectified line voltage is added to the reference waveform and the feedback signal, and serves to modulate the pulse width of the boost circuit in a manner that reduces the harmonic distortion of the input current. In addition to the boost circuit, the power factor correction circuit can be realized with flyback and buck-boost topologies.

U.S. Pat. No. 5, 612,609 to Choi entitled Continuous Conduction Mode Switching Power Supply with Improved Power Factor Correction, disclosed a power factor correction circuit in which an inductor current is detected separately as a charging current indication signal and a discharging current indication signal by using a current sense resistor and a current sense circuit. It is disclosed a scaled-down output DC voltage is compared with a predetermined reference DC voltage by using an error amplifier which serves to produce an output voltage error signal. The output voltage error signal is then multiplied with a divided-down rectified input line voltage through the use of the multiplier to generate a sinusoidal reference signal. The sinusoidal reference signal is used by peak and valley comparators which also receive the charging and the discharging current indication signals. The outputs from the peak and the valley comparators are used to control a FET transistor which controls the input line current.

U.S. Pat. No. 5,644,214 to Lee entitled Power Factor Correction Circuit, discloses a continuous current type power factor correction circuit in a power device having rectifying means for rectifying an alternating current, a booster converter having an inductor, a diode and capacitor series connected to an output terminal of the rectifying means, a control switch connected in parallel with the series connection of the diode and a capacitor, and a load connected across the capacitor for outputting a boosted direct current to the load according to switching operation of the control switch, and a power factor correction circuit controlling the switching operation of the control switch, the power factor correction circuit, comprising an off-time controller comparing a first voltage signal with a second voltage signal and generating an off signal in response to the comparison, an on-time controller generating an on signal in accordance with a charge time period of the capacitor, the charge time period being determined from a point in time wherein the off-time controller generates the off signal, and a drive signal generator, respectively receiving the off and on signals, latching the off and on signals, and generating a drive signal which controls operation of the control switch.

U.S. Pat. No. 5,726,871 to Choi entitled Power Supply Circuit with Power Saving Mode for Video Display Appliance, discloses a power supply circuit for a video display appliance capable of reducing even the unnecessary power consumption caused by a power factor correction circuit when a display control for power saving is performed. It is disclosed that the power supply circuit includes a rectifying section, a power factor correction section. an SMPS, a control section for determining whether to perform a display control for power saving of the video display appliance to provide a control signal, and a switching section for controlling the operation of the power factor correction section according to the control signal provided from the control section.

U.S. Pat. No. 5,757,166 to Sodhi entitled Power Factor Correction Controlled Boost Converter with an Improved Zero Current Detection Circuit for Operation under High Input Voltage Conditions, discloses an electronic power supply circuit having a rectifier circuit adapted to receive a source of alternating current, a power factor correction driven boost converter, and a bulk capcitance. It is disclosed the boost converter includes a boost transformer having a primary winding and a secondary winding, a boost switch, a boost diode, a zener diode, and a power factor correction control circuit having a zero current detect input. The presence of the zener diode effectively adds a fixed offset to the voltage provided to the zero current detect input, thereby allowing the boost converter to operate under high input line voltage conditions. The zener diode can be oriented in various ways, and can be incorporated into an integrated circuit containing other elements of the power factor correction control circuit. One particular embodiment of the power supply circuit is for use in an electronic ballast for fluorescent lamps.

U.S. Pat. No. 5,757,635 to Seong entitled Power Factor Correction Circuit and Circuit Therefor Having Sense-FET and Boost Converter Control Circuit, discloses a power factor correction circuit including a boost converter, a zero-current detector for detecting a period in which an inductor current is zero, a half-wave rectifier for supplying a power voltage proportional to an output voltage of the boost converter, a control voltage generator for generating a control voltage to control the turn-on time timing of a sense-FET, a turn-on controller for making constant a turn-on duration of the sense-FET, an over current detector for generating a signal when a mirror terminal current of the sense-FET is greater than a predetermined current, an OR gate for performing a logic OR operation of the output signals of the turn-on controller and the over current detector, an output current controller for generating a gate drive signal of the sense-FET, and an under voltage lock out for turning off the power voltage when the power voltage is less than a predetermined voltage. This circuit enables an external pin count to be reduced by having a built-in boost converter controller and a built-in sense-FET in a single package.

U.S. Pat. No. 5,764,039 to Choi entitled Power Factor Correction Circuit Having Indirect Input Voltage Sensing, discloses a power factor correction circuit for a boost-type voltage converter determines the input voltage by sensing the rate at which the current through an inductor changes when a switching transistor is turned on. The circuit includes a current sense circuit which generates a control signal in response to the current flowing in the inductor. The control signal is compared with a sawtooth signal to control the input current waveform. It is disclosed an output detecting circuit generates a comparison reference signal for regulating the output voltage of the converter. The comparison reference signal is summed with the control signal to provide a comparison signal. A comparison circuit compares the comparison signal with the sawtooth signal and generates a pulse width modulated signal for controlling the switch. A compensation signal generator generates a compensated comparison signal in response to a ripple component in the output signal of the converter. The compensated comparison signal is summed with the sawtooth signal to compensate for distortion in the input current, thereby increasing the power factor. An amplifier in the sense circuit allows a low value sense resistor to be used.

SUMMARY OF THE INVENTION

It is an object of the present invention to provide a power supply device with a power factor correction (PFC) circuit, which stops the switching operation of the switching transistor to save power in the power saving mode.

According to an embodiment of the present invention, a power supply device for supplying power to an electronic apparatus with a power saving mode comprises a rectifier circuit for converting an input alternating current voltage (AC voltage) Vin to a direct current voltage (DC voltage), a boost circuit for boosting the DC voltage to a prescribed level, a power factor correction (PFC) circuit for correcting the power factor of the output voltage of the boost circuit according to a feedback voltage from the output of the boost circuit, and a disable circuit for disabling the power factor correction (PFC) circuit in the power saving mode, whereby power consumption is prevented for the operation of the power factor correction (PFC) circuit in the power saving mode.

The power factor correction (PFC) circuit preferably includes a power factor correction (PFC) controller for maintaining the output voltage constant in response to the feedback voltage, a switching circuit for selectively turning on and off to correct the power factor, and a switching drive circuit for generating a switch drive signal to drive the switching circuit in response to the control signal of the power factor correction (PFC) controller, whereby the switching drive circuit selectively cuts off the switch drive signal upon receiving an activated control signal from the power factor correction (PFC) disable circuit.

The power factor correction (PFC) disable circuit preferably includes a feedback circuit for feeding back a part of the output voltage of boost circuit to the power factor correction (PFC) controller, a power saving mode detector for detecting the power saving mode depending on the level of the feedback voltage, a comparator for generating an active control signal or not accordingly as the output voltage of the power saving mode detector is lower than a prescribed voltage or not, and a drive circuit controller for stopping the switching drive circuit upon receiving the active control signal. The feedback circuit produces the output feedback voltage inversely varying with the output voltage of the boost circuit, thereby adjusting the on-duty interval of the power factor correction (PFC) circuit.

Thus, when the power saving mode is demanded by the electronic apparatus, the output of the power factor correction (PFC) circuit is fed back to the power saving mode detector to generate a mode detection signal, which is compared with the prescribed reference voltage by the comparator, whose active control signal is supplied to the drive circuit controller to disable the switching drive circuit.

The present invention will now be described more specifically with reference to the drawings attached only by way of example.

BRIEF DESCRIPTION OF THE ATTACHED DRAWINGS

A more complete appreciation of the invention, and many of the attendant advantages thereof, will be apparent as the same becomes better understood by reference to the following detailed description when considered in conjunction with the accompanying drawings in which like reference symbols indicate the same or similar components, wherein.

Figure 3:
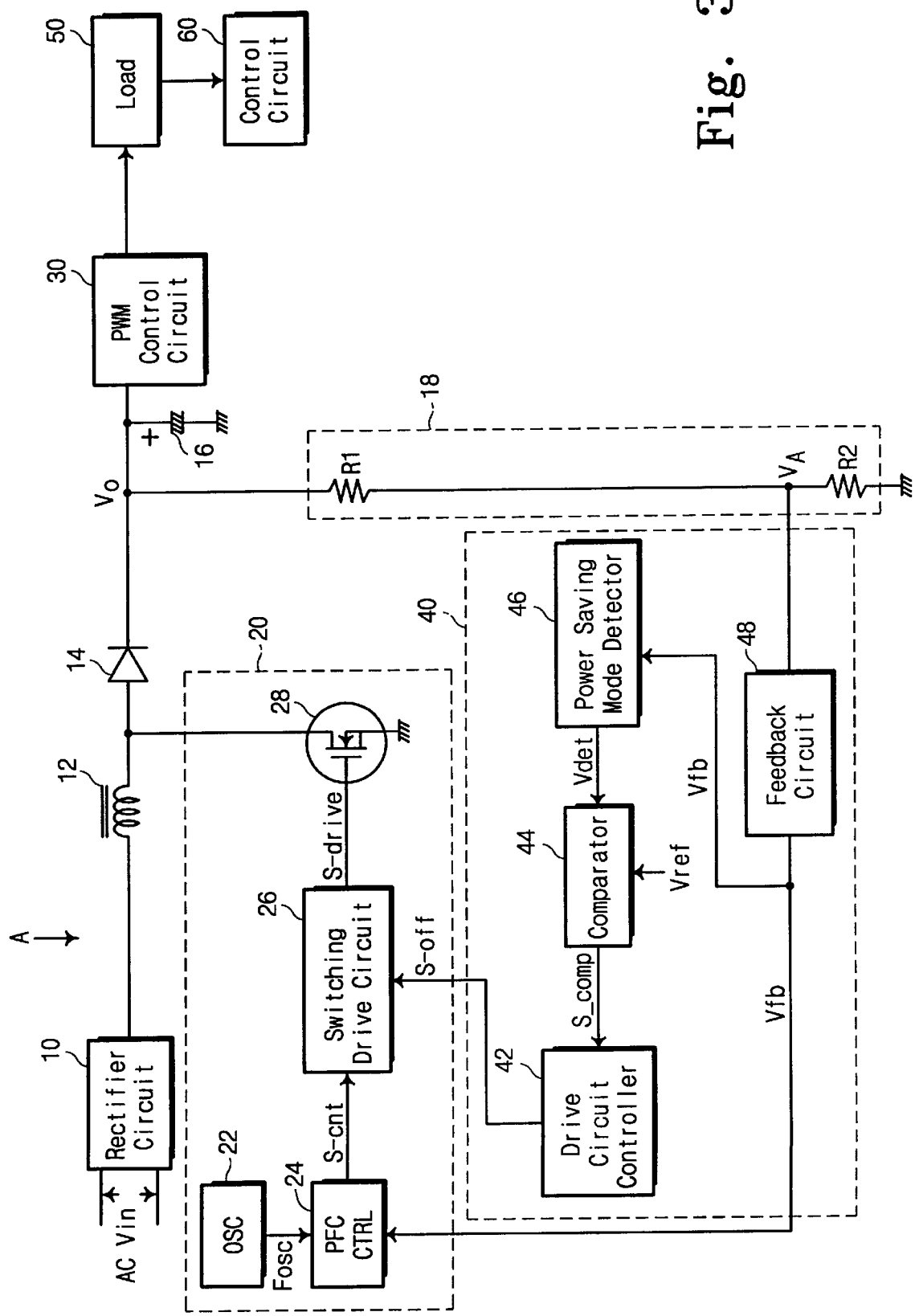
Figure 4:
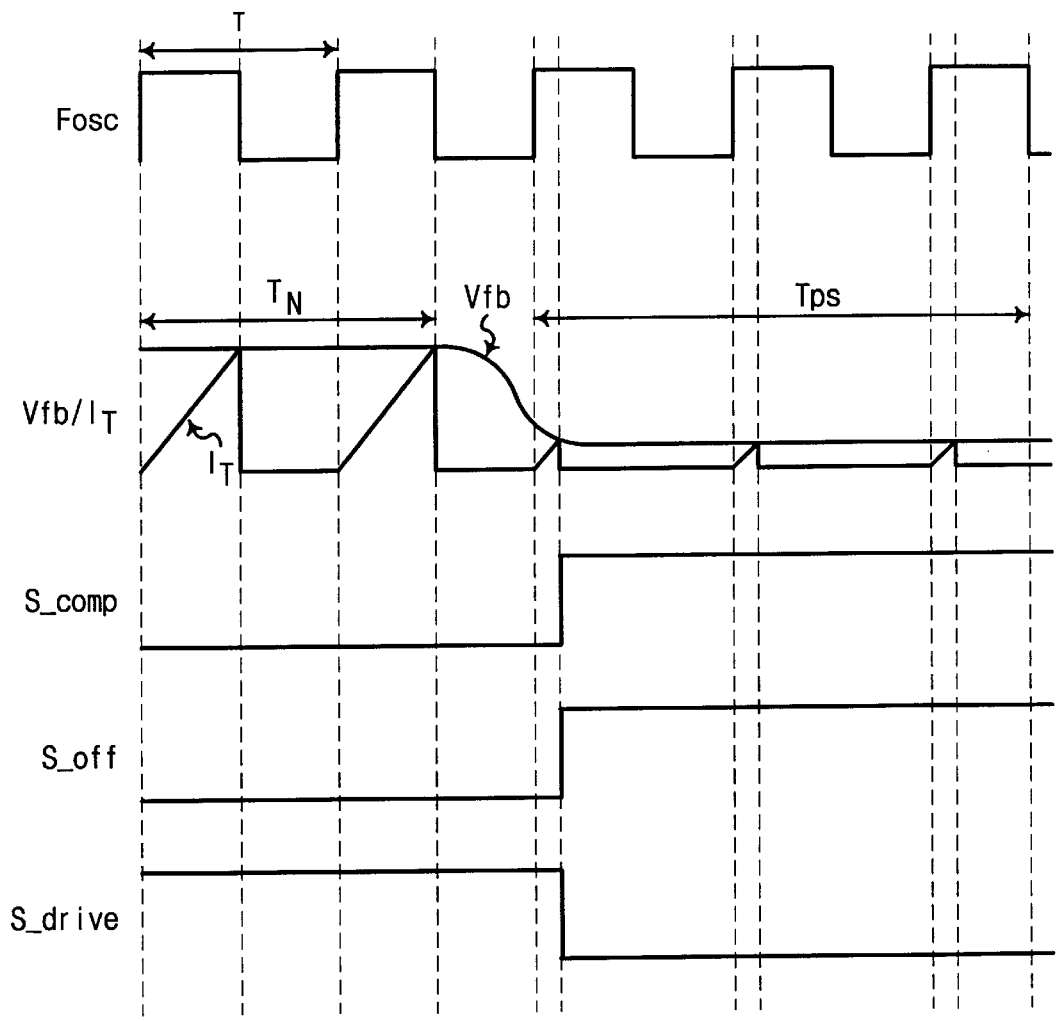

FIG. 3 is a diagram for illustrating an embodiment of a power factor correction (PFC) circuit and power factor correction (PFC) disable circuit used in a power supply device according to the present invention; and FIG. 4 is illustration of the waveforms of the output voltage of the feedback circuit and the output current of the primary coil of the boost circuit in the normal operation mode and in the power saving mode according to the switching frequency of the power supply device of in FIG. 3 according to the present invention.

DESCRIPTION OF THE PREFERRED EMBODIMENTS

Figure 1:
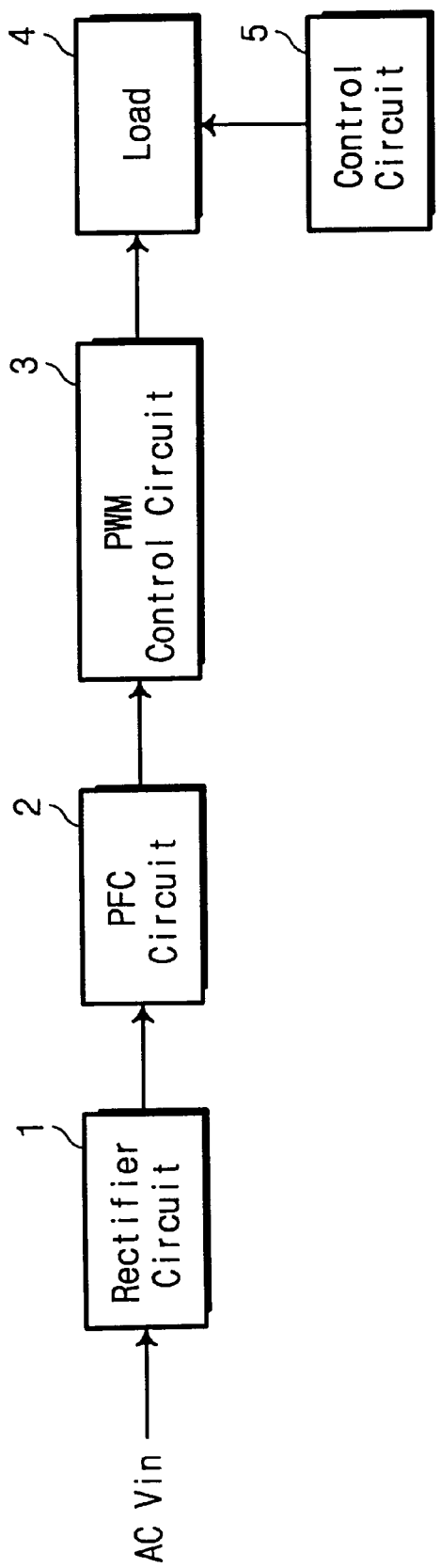
FIG. 1 is a block diagram for illustrating a power supply device exemplary of contemporary practice in the art.

Referring to FIG. 1, a switching mode power supply device exemplary of contemporary practice in the art generally includes a rectifier circuit 1 for rectifying an alternating current voltage (AC) voltage into a ripple voltage, a power factor correction (PFC) circuit 2 connected between the rectifier circuit 1 and a load 4 with a power saving mode to correct the power factor of the output voltage, and a pulse width modulation (PWM) circuit 3. The power saving mode of the load 4 is achieved by a power saving mode control circuit 5 such as display power management system (DPMS) connected to the load.

Figure 2:
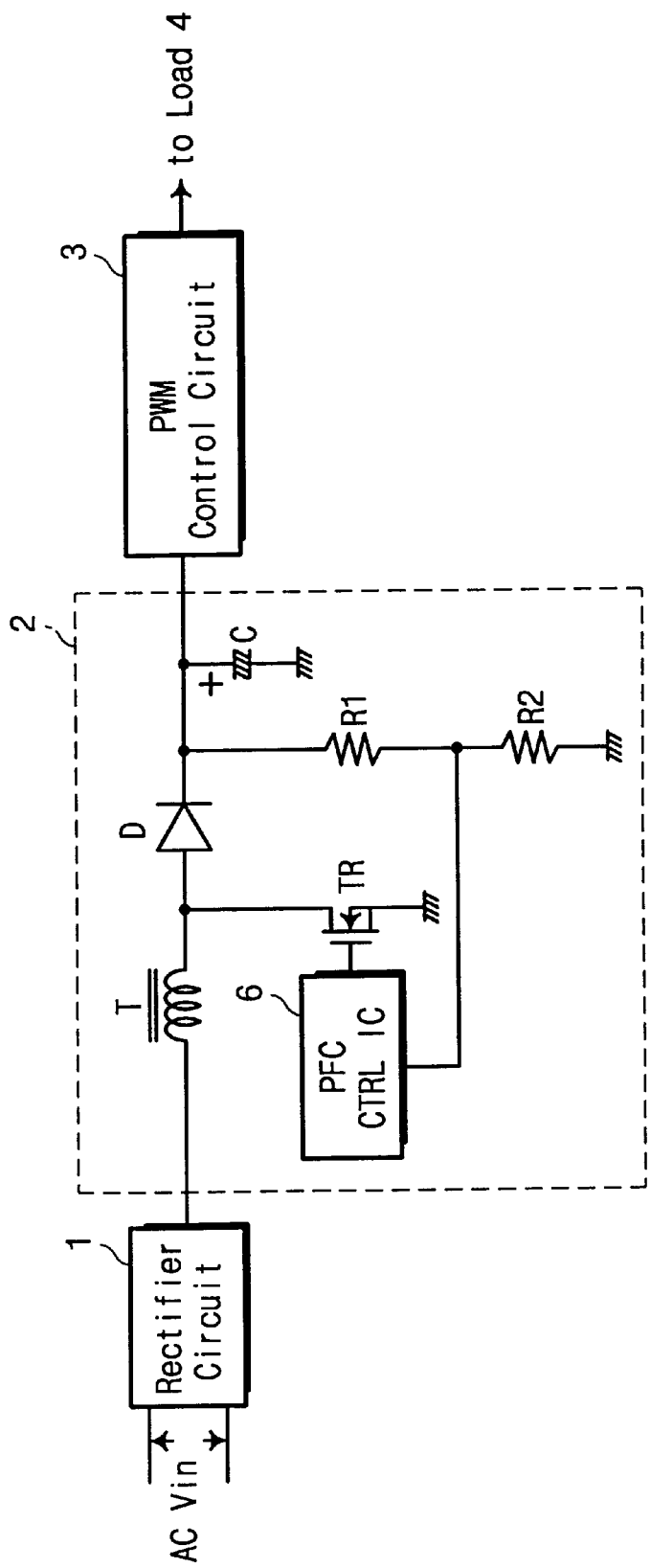
FIG. 2 is a diagram for illustrating a power factor correction (PFC) circuit exemplary of contemporary practice in the art used in the power supply device as shown in FIG. 1.

Referring to FIG. 2, a power factor correction circuit 2 exemplary of contemporary practice in the art includes a power factor correction (PFC) controller 6, a switching transistor TR, and a booster transformer T for boosting the output voltage of the rectifier circuit 1, which consists of bridge diodes, according to the turning on/off of the switching transistor TR. In this case, the rectifier circuit 1 is to convert an alternating current voltage (AC voltage) into a direct current voltage (DC voltage) of a ripple waveform. The supplied AC voltage, for example, is about 90V to 260V. Additionally provided are a diode D for rectifying the voltage induced in the primary coil of the boost transformer T, a smoothing capacitor C and a voltage divider, such as, including resistors R1, R2, for regulating the output voltage of the power factor correction (PFC) circuit 2.

Referring to FIGS. 1 and 2, in the normal mode of the power supply device, the rectifier circuit 1 supplies a direct voltage to the power factor correction (PFC) circuit 2, where the DC output voltage comes to have a value of about 400V according to the on/off operation of the switching transistor TR. The output is applied to the pulse width modulation (PWM) control circuit 3, thereby securing the normal operation of the main power supply circuit (not shown). When the load such as an electronic apparatus is set to the power saving mode by a microprocessor or display power management system (DPMS), the duty ratio of the output pulses of the pulse width modulation (PWM) control circuit 3 becomes much lower than in the normal mode, so that the load is supplied with the minimum power required only to operate the control circuit 5 for controlling the power saving mode.

However, the circuit exemplary of contemporary practice in the art requires the continuous operation of the power factor correction (PFC) circuit 2 even in the power saving mode, thus causing power consumption due to the turning on/off of the switching transistor TR.

Referring now to FIG. 3, there is illustrated an embodiment of a power supply device A according to the present invention. The power supply device A includes a rectifier circuit 10, a boost circuit 12, a power factor correction (PFC) circuit 20, and a power factor correction (PFC) disable circuit 40.

Referring to FIG. 3, connected between the rectifier circuit 10 and a load 50 are the boost circuit 12, a power factor correction (PFC) circuit 20 and a pulse width modulation (PWM) control circuit 30. Additionally provided in communication with the power factor correction (PFC) circuit 20 is the power factor correction (PFC) disable circuit 40. The rectifier circuit 10 converts an input alternating current voltage (AC voltage) Vin to a direct current voltage (DC voltage) of a ripple wave, which DC voltage is boosted up to a prescribed level by the boost circuit 12. A part of the output voltage Vo is fed back to the power factor correction (PFC) circuit 20 to adjust the duty ratio to make the output voltage stable. The power factor correction (PFC) circuit 20 includes an oscillator (OSC) 22 for determining the switching frequency, a power factor correction (PFC) controller 24 for controlling the operation of the power factor correction (PFC) circuit 20 according to the feedback voltage, a switching circuit 28, such as including a switching transistor, for making the switching operations to correct the power factor, and a switching drive circuit 26 for driving the switching circuit 28 according to a switch control signal S_cnt of the power factor correction (PFC) controller 24.

There is also provided a diode 14 for rectifying the voltage induced in the primary coil of the boost circuit 12. The output voltage Vo of the diode 14 is regulated by a voltage divider 18 including a first resister R1 and a second resistor R2. The output DC voltage Vo of the diode 14 is smoothed by a smoothing capacitor 16 applied to the pulse width modulation (PWM) control circuit 30. Hence, the energy($P=½LI^2$) is stored into the inductor of the boost circuit 12, or the stored energy being transferred through the diode 14 to the capacitor 16, accordingly as the power factor correction (PFC) circuit 20 is selectively switched on or off.

The power factor correction (PFC) disable circuit 40 includes a feedback circuit 48, a power saving mode detector 46, a comparator 44 and a drive circuit controller 42. The feedback circuit 48 supplies a feedback voltage Vfb to the power factor correction (PFC) controller 24 for controlling the on-duty ratio and to the power saving mode detector 46 in order to maintain the output voltage Vo of the boost circuit 12 constant. Namely, the feedback voltage Vfb is varied inversely with the output voltage Vo of the boost circuit 12, adjusting the duty ratio to correct the power factor by the power factor correction (PFC) controller 24. The power saving mode detector 46 detects the power saving mode by the feedback voltage Vfb.

The comparator 44 compares the output voltage Vdet of the power saving mode detector 46 with a reference voltage Vref prescribed for detecting the power saving mode, generating an active control signal S_comp to control the drive circuit controller 42. The active control signal S_comp is activated or not accordingly as the detection signal Vdet is lower than the reference voltage Vref or not. The drive circuit controller 42 generates a switch drive control off signal S_off delivered to the switching drive circuit 26 in response to the active control signal S_comp. When the switch drive control off signal S_off of the drive circuit controller 42 is activated, the switch drive control off signal S_off controls the switching drive circuit 26 to stop the operation of the switching circuit 28 of power factor correction (PFC) circuit 20.

The pulse width modulation (PWM) control circuit 30 controls the pulse width modulation (PWM) on the high DC voltage received from the capacitor 16 to selectively supply or cut off the voltage required for each terminal of the load 50. More specifically, the supplied voltage is converted through the rectifier circuit 10 to a ripple wave, which is boosted by the boost circuit 12 of the power factor correction (PFC) circuit 20 to a constant DC voltage Vo of about 400V. The pulse width modulation (PWM) control circuit 30 performs the switching operations of pulse width modulation on the output voltage Vo, distributing a plurality of voltages through a transformer (not shown) to each terminal of the load 50 to be in the normal operation mode.

Referring to FIGS. 3 and 4, in the power saving mode, the control circuit 60 (represented by 5 in FIG. 1) of a power management system such as a display power management system (DPMS) cuts off all the power supplied to the load 50 except the minimum power, for example, 5W required for keeping the power saving mode. In this case, the feedback circuit 48 detects the output voltage Vo to supply the feedback voltage Vfb to the power factor correction (PFC) controller 24. As shown in FIG. 4, the power factor correction (PFC) controller 24 decreases or increases the on-duty interval by the lowering or raising of the feedback voltage Vfb of the feedback circuit 48 according as the output voltage Vo is rising or falling, thus maintaining the output voltage Vo constant. However, the feedback voltage Vfb must have a short on-duty interval, supplied to the input terminal of the power factor correction (PFC) controller 24 to generate a switch control signal S_cnt to correct the power factor. This causes the output voltage Vo to be lower than in the normal operation mode, and thus the feedback voltage Vfb is also lowered.

Then, the power saving mode detector 46 detects the feedback voltage Vfb to generate the detection signal Vdet compared by the comparator 44 with the reference voltage Vref. If the detection signal Vdet is lower than the reference voltage Vref, the comparator 44 delivers the active control signal S_comp to the drive circuit controller 42, which, in response to the active control signal S_comp, subsequently generates the switch drive control off signal S_off applied to the switching drive circuit 26 to stop the switching operation of the power factor correction (PFC) circuit 20. Thus, there is prevented power consumption due to the switching operation of the power factor correction (PFC) circuit 20 in the power saving mode.

Referring to FIG. 4 for illustrating the relationship between the inductor current $I_T$ of the boost circuit 12 and the feedback voltage Vfb of the feedback circuit 48 according to the switching frequency Fosc having time period T of the oscillator (OSC) 22 in the normal operation mode over time $T_N$ and in the power saving mode over time Tps, the output voltage Vo of the boost circuit 12 is lowered due to the reduced on-duty ratio in the power saving mode. Here, the power saving mode detector 46 detects the power saving mode to generate the detection signal Vdet transferred to the comparator 44. If the detection signal Vdet is lower the reference voltage Vref, the comparator 44 generates the active control signal S_comp supplied to the drive circuit controller 42 to activate the switch drive control off signal S_off. Then, in the response to the switch drive control off signal S_off, the switch drive signal S_drive of the switching drive circuit 26 is inactivated to stop the operation of the switching circuit 28, thereby preventing power consumption due to the switching operation.

Thus, the power factor correction (PFC) circuit 20 is controlled by the feedback voltage Vfb to maintain the output voltage constant in the normal operation mode while cutting off the switching operation to more reduce the power consumption in the power saving mode.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A power supply device for supplying power to an electronic apparatus, comprising:

a rectifier circuit for converting an input alternating current voltage to a direct current voltage;

a boost circuit for boosting said direct current voltage to a prescribed voltage level;

a power factor correction circuit for correcting a power factor of an output voltage of said boost circuit according to a feedback voltage derived from an output of said boost circuit; and a power factor correction disable circuit for providing a switch drive control off signal to said power factor correction circuit, said switch drive control off signal for disabling a switching operation of said power factor correction circuit in a power saving mode, said switching operation for correcting said power factor, whereby power consumption is prevented for said switching operation of said power factor correction circuit in said power saving mode, said power factor correction disable circuit comprising:

a feedback circuit for feeding back a part of said output voltage of said boost circuit as said feedback voltage to said power factor correction circuit;

a power saving mode detector for detecting said power saving mode depending on a level of said feedback voltage;

a comparator for generating an active control signal when an output voltage of said power saving mode detector is lower than a prescribed reference voltage; and a drive circuit controller for generating said switch drive control off signal upon receiving said active control signal.

2. A power supply device for supplying power to an electronic apparatus, comprising:

a rectifier circuit for converting an input alternating current voltage to a direct current voltage;

a boost circuit for boosting said direct current voltage to a prescribed voltage level;

a power factor correction circuit for correcting a power factor of an output voltage of said boost circuit according to a feedback voltage derived from an output of said boost circuit, said power factor correction circuit comprising;

a power factor correction controller for maintaining said output voltage of said boost circuit constant in response to said feedback voltage;

a switching circuit for selectively turning on and off for a switching operation to correct said power factor; and a switching drive circuit for generating a switch drive signal to drive said switching circuit for said switching operation in response to a control signal from said power factor correction controller, and said switching drive circuit for selectively cutting off said switch drive signal upon receiving a switch drive control off signal; and a power factor correction disable circuit for providing said switch drive control off signal to said power factor correction circuit, said switch drive control off signal for disabling said switching operation of said power factor correction circuit in a power saving mode, said switching operation for correcting said power factor, whereby power consumption is prevented for said switching operation of said power factor correction circuit in said power saving mode, said power factor correction disable circuit comprising:

a feedback circuit for feeding back a part of said output voltage of said boost circuit as said feedback voltage to said power factor correction controller;

a power saving mode detector for detecting said power saving mode depending on a level of said feedback voltage;

a comparator for generating an active control signal when an output voltage of said power saving mode detector is lower than a prescribed reference voltage; and a drive circuit controller for generating said switch drive control off signal for stopping said switching drive circuit from generating said switch drive signal upon receiving said active control signal.

3. The power supply device as claimed in claim 2, further comprised of said feedback circuit producing an output voltage inversely varying with said output voltage of said boost circuit as said feedback voltage, thereby adjusting an on-duty interval of said power factor correction circuit.

4. A power supply device for supplying power to an electronic apparatus, comprising:

a rectifier circuit for converting an input alternating current voltage to a direct current voltage;

a boost circuit for boosting said direct current voltage to a prescribed voltage level;

a power factor correction circuit for correcting a power factor of an output voltage of said boost circuit according to a feedback voltage derived from an output of said boost circuit, said power factor correction circuit comprising:

a power factor correction controller for maintaining said output voltage of said boost circuit constant in response to said feedback voltage;

a switching circuit for selectively turning on and off for a switching operation to correct said power factor; and a switching drive circuit for generating a switch drive signal to drive said switching circuit for said switching operation in response to a control signal from said power factor correction controller, and said switching drive circuit for selectively cutting off said switch drive signal upon receiving a switch drive control off signal; and a power factor correction disable circuit for providing said switch drive control off signal to said power factor correction circuit, said switch drive control off signal for disabling said switching operation of said power factor correction circuit in a power saving mode, said switching operation for correcting said power factor, whereby power consumption is prevented for said switching operation of said power factor correction circuit in said power saving mode, said power factor correction disable circuit comprising:

a feedback circuit for feeding back a part of said output voltage of said boost circuit as said feedback voltage to said power factor correction controller;

a power saving mode detector for detecting said power saving mode depending on a level of said feedback voltage;

a comparator for generating an active control signal according to a result of a comparison of an output voltage of said power saving mode detector and a prescribed reference voltage; and a drive circuit controller for generating said switch drive control off signal for stopping said switching drive circuit from generating said switch drive signal upon receiving said active control signal.

5. The power supply device as claimed in claim 4, further comprised of said feedback circuit producing an output voltage inversely varying with said output voltage of said boost circuit as said feedback voltage, thereby adjusting an on-duty interval of said power factor correction circuit.

6. The power supply device as claimed in claim 2, further comprised of said feedback voltage comprising an output voltage inversely varying with said output voltage of said boost circuit, thereby adjusting an on-duty interval of said power factor correction circuit.

7. The power supply device as claimed in claim 1, further comprised of said feedback voltage comprising an output voltage inversely varying with said output voltage of said boost circuit, thereby adjusting an on-duty interval of said power factor correction circuit.

8. The power supply device as claimed in claim 1, further comprised of said feedback circuit producing an output voltage inversely varying with said output voltage of said boost circuit as said feedback voltage, thereby adjusting an on-duty interval of said power factor correction circuit.

9. A method for supplying power to an electronic apparatus, comprising the steps of:

converting by a rectifier circuit an input alternating voltage to a direct current voltage;

boosting by a boost circuit said direct current voltage to a prescribed voltage level;

correcting a power factor of an output voltage of said boost circuit by a power factor correction circuit according to a feedback voltage derived from an output of said boost circuit;

feeding back by a feedback circuit a part of said output voltage of said boost circuit as said feedback voltage to said power factor correction circuit;

detecting by a power saving mode detector a power saving mode depending on a level of said feedback voltage;

generating an active control signal by a comparator when an output voltage of said power saving mode detector is lower than a prescribed reference voltage; and generating by a drive circuit controller a switch drive control off signal for stopping a switching drive circuit from generating a switch drive signal upon receiving said active control signal to disable a switching operation of said power factor correction circuit in said power saving mode by said switch drive control off signal, said switching operation for correcting said power factor, whereby power consumption is prevented for said switching operation of said power factor correction circuit in said power saving mode.

10. The method according to claim 9, further comprising the steps of:

maintaining by a power factor correction controller said output voltage of said boost circuit constant in response to said feedback voltage;

selectively turning on and off a switching circuit for said switching operation to correct said power factor;

generating by said switching drive circuit said switch drive signal to drive said switching circuit for said switching operation in response to a control signal from said power factor correction controller; and cutting off said switch drive signal by said switching drive circuit upon receiving said switch drive control off signal.

11. The method according to claim 9, further comprised of said feedback voltage comprising an output voltage inversely varying with said output voltage of said boost circuit, thereby adjusting an on-duty interval of said power factor correction circuit.

12. A method for supplying power to an electronic apparatus, comprising the steps of:

converting by a rectifier circuit an input alternating voltage to a direct current voltage;

boosting by a boost circuit said direct current voltage to a prescribed voltage level;

correcting a power factor of an output voltage of said boost circuit by a power factor correction circuit according to a feedback voltage derived from an output of said boost circuit;

feeding back by a feedback circuit a part of said output voltage of said boost circuit as said feedback voltage to a power factor correction controller;

maintaining by said power factor correction controller said output voltage of said boost circuit constant in response to said feedback voltage;

selectively turning on and off a switching circuit for a switching operation to correct said power factor;

generating by a switching drive circuit a switch drive signal to drive said switching circuit for said switching operation in response to a control signal from said power factor correction controller;

detecting by a power saving mode detector a power saving mode depending on a level of said feedback voltage;

generating an active control signal by a comparator according to a result of a comparison of an output voltage of said power saving mode detector and a prescribed reference voltage;

generating by a drive circuit controller a switch drive control off signal for stopping said switching drive circuit from generating said switch drive signal upon receiving said active control signal; and cutting off said switch drive signal by said switching drive circuit upon receiving said switch drive control off signal from said drive circuit controller to disable said switching operation in said power saving mode, said switching operation for correcting said power factor, whereby power consumption is prevented for said switching operation of said power factor correction circuit in said power saving mode.

* * * * *